UNITED STATES PATENT OFFICE 2,626,211

WEED KILLER

Frank J. Sowa, Cranford, N. J.

No Drawing. Application January 4, 1950,
Serial No. 136,850

7 Claims. (Cl. 71—2.2)

This invention relates to herbicides such as weed killers and is directed particularly to compositions containing monoammino boron trifluoride ($NH_3 \cdot BF_3$) as an essential active ingredient.

Many types of weed killers are known, but they generally are found objectionable or inadequate for many purposes. Thus for example sodium chlorate is an excellent weed killer, but weeds treated with this composition are highly inflammable, and therefore sodium chlorate is not suitable for use along the right of way of railroads or power lines or in forested areas. On the other hand, sodium arsenite, potassium cyanate and phenylmercury compounds are also effective as weed killers, but because of their poisonous nature they cannot be used with safety in areas where cattle or other animals may be grazing. Furthermore, practically all of the common weed killer compositions are only temporarily effective and therefore must be applied frequently to weed infested areas.

I have discovered that compositions containing monoammino boron trifluoride are not only effective as weed killers, but they have the most unusual property of being selective in their killing action when used in limited concentrations, whereas in higher concentrations they actually impart sterility to the soil whereby a single application may prevent the growth of weeds on tennis courts, driveways or elsewhere for a period of two or three years or more. Furthermore, these compositions are effective fire retardants so that the dead weeds are substantially non-inflammable. On the other hand, the compositions are not actively poisonous and there is some evidence that weeds treated therewith are actually repellent or repulsive to many animals.

One of the objects of the invention is to provide novel herbicidal compositions containing monoammino boron trifluoride as an essential active ingredient.

A further object of the invention is to provide herbicidal compositions which impart sterility to the soil when used in relatively high concentrations, but which are selective in their action when used in limited concentrations.

Another object of the invention is to provide novel methods for destroying crab grass.

These and other objects and features of the present invention will appear from the following description thereof in which reference is made to preferred compositions and methods of using the same for the purpose of indicating the nature of the invention, but without intending to limit the invention thereby.

The compositions of the present invention contain as their essential active ingredient monoammino boron trifluoride ($NH_3 \cdot BF_3$).

The preferred compositions are in the form of aqueous solutions which include non-ionic type wetting agents. Typical of those wetting agents that have been employed to advantage are polyethylene ether of fatty alcohols, polyethylene glycol condensation products and long chain alcohol sulfates or in fact substantially any of the conventional wetting agents other than the salts of organic acids. Those wetting agents which consist of sodium salts of organic acids, such as the long chain fatty acids or sulfated oils are generally found to be incompatible with aqueous solutions of monoammino boron trifluoride and therefore are not ordinarily employed. The amount of wetting agent used in preferably sufficient to produce an aqueous solution containing 1% of the monoammino boron trifluoride and having a surface tension below about 40 dynes per centimeter at 23° C. although solutions having a surface tension up to 65 dynes per centimeter may be used.

When the composition is in the form of an aqueous solution for killing of grasses or weeds and it is desired to impart sterility to the soil in the area treated the amount of monoammino boron trifluoride applied per acre ranges from 150 to 400 lbs. However, when the composition is to be used for selective killing of weeds such as crab grass and plantain the concentration of the monoammino boron trifluoride should be from about 25 to 75 lbs. per acre. The concentration of the compound in any aqueous solution may be varied to suit the spraying equipment used provided the rate of application of the compound per acre is controlled. Thus concentrations of from 0.10 to 10% by weight of the water may be used. It is desirable to employ a wetting agent for the purpose of causing the composition to spread over the surface of the weeds treated and further for the purpose of increasing the absorption of composition through the root system of the plants. The amount of wetting agent used is preferably equal to 0.10 to 1% by weight of the solution or about 10 to 100% of the weight of monoammino boron trifluoride.

Example 1

One typical composition has the following formula:

| | Parts by weight |
|---|---|
| $NH_3 \cdot BF_3$ | 1 |
| Wetting agent | 1½ |
| Water | 100 |

In tests conducted at the Rutgers University Agriculture School it was found that a single application of this composition by means of a single nozzle hand sprayer at pressures ranging from 15 to 30 pounds and at the rate of 16 gallons per 1000 square feet to an area infected with crab grass served to kill 94.9% of the crab grass and although other grasses were at first discolored they effectively recovered. Further it was found that when three successive applications were made in the same manner, applying the solution at the rate of 25 lbs. of the complex per acre, approximately 96% of the crab grass was killed while substantially 98% of the crab grass was killed when making two applications at the rate of 40 lbs. to the acre but the discoloration is "moderate."

*Example 2*

Another typical composition is as follows:

| | Parts by weight |
|---|---|
| $NH_3 \cdot BF_3$ | 3 to 10 |
| Wetting agent | 1 |
| Water | 90 |

This composition is effective in killing substantially all weeds in the area treated and when the concentration of the $NH_3 \cdot BF_3$ is in the neighborhood of 10% it is an excellent agent for use in killing poison ivy. The composition is sprayed on the affected area at the rate of 16 gallons per 1000 square feet and will impart sterility to the soil for a period of many months.

The amount of the composition required to obtain the best results in any application varies considerably and is dependent on numerous factors. Thus if the crab grass consists of young tender shoots it is not necessary to use as high a concentration per acre as when the plants are mature and strong. The composition also appears to be more effective when applied on a hot dry day than when the air is moist and cool.

In preparing the products for shipment and storage it is preferable to mix the monoammino boron trifluoride thoroughly with the wetting agent using an anhydrous form of a non-ionic wetting agent so as to avoid separation on standing of a layer of saturated aqueous solution. Typical products of this type contain 75 parts by weight of monoammino boron trifluoride and from 10 to 50 parts by weight of anhydrous polyethylene glycol condensation product.

While the compositions of the present invention may be used in the form of an aqueous solution without adding a wetting agent the surface tension of such solutions is relatively high and they therefore have to be applied more heavily to insure thorough wetting of the surfaces of the weeds and absorption thereof by the root system of the plant. In such cases application is generally made at the rate of 200 lbs. or more per acre and selective killing of crab grass and plantain is not possible at such high concentrations. In fact sterility of the soil usually results from such heavy application of the composition.

Any of the foregoing compositions when applied for killing weeds is also active as a fire retardant, whereas the dried weeds are not injurious or irritating to the skin.

While various compositions have been described and typical methods for using such compositions have been cited it will be apparent that they may be varied considerably by the addition of other agents thereto and by their application in other ways to areas in which weeds or vegetation is to be killed. In view thereof it should be understood that the examples cited above are intended to be illustrative only and are not intended to limit the scope of the invention.

I claim:

1. The method of killing weeds which comprises the step of applying thereto an aqueous solution containing from about 0.10 to 10% by weight of monoammino boron trifluoride at the rate of about 16 gallons of solution per 1000 square feet.

2. The method of killing weeds which comprises the step of applying thereto an aqueous solution containing from about 0.10 to 10% by weight of monoammino boron trifluoride together with from about 0.10 to 1% by weight of a wetting agent, at the rate of about 16 gallons per 1000 square feet.

3. The method of imparting sterility to soil which comprises the step of applying thereto an aqueous solution containing monoammino boron trifluoride at the rate of from about 150 to 400 pounds of compound per acre.

4. A composition characterized by its ability to selectively kill crab grass in the presence of other desirable lawn grasses consisting of an aqueous solution containing from 0.10 to 1% by weight of monoammino boron trifluoride and from 0.10 to 1% by weight of a wetting agent, the balance of the composition being water.

5. The method of selectively killing crab grass which comprises the steps of spraying onto crab grass infected turf an aqueous solution containing from 0.10 to 1% by weight of monoammino boron trifluoride and from 0.10 to 1% by weight of a non-ionic wetting agent dissolved in water at the rate of about 25 to 75 pounds of the monoammino boron trifluoride per acre.

6. An herbicidal composition consisting of monoammino boron trifluoride and sufficient wetting agent to impart to an aqueous solution containing from 0.1 to 1% by weight of the monoammino boron trifluoride a surface tension not exceeding about 40 dynes per centimeter at 23° C.

7. An herbicidal composition consisting of approximately 75 parts by weight of monoammino boron trifluoride and from 10 to 50 parts by weight of a non-ionic wetting agent.

FRANK J. SOWA.

REFERENCES CITED

The following references are of record in the file of this patent:

UNITED STATES PATENTS

| Number | Name | Date |
|---|---|---|
| 2,277,744 | Cuprey et al. | Mar. 31, 1942 |
| 2,390,941 | Jones | Dec. 11, 1945 |
| 2,392,859 | Meuli | Jan. 15, 1946 |
| 2,394,916 | Jones | Feb. 12, 1946 |
| 2,544,141 | Donleavy | Mar. 6, 1951 |

FOREIGN PATENTS

| Number | Country | Date |
|---|---|---|
| 10,450 of 1905 | Great Britain | May 17, 1906 |

OTHER REFERENCES

Journal of American Society of Agronomy, Apr. 1941, page 367.